United States Patent [19]
Poll

[11] Patent Number: 6,003,871
[45] Date of Patent: Dec. 21, 1999

[54] CASSETTE TYPE SEAL WITH RADIAL AND AXIAL LIP

[75] Inventor: Gerhard W. Poll, Hannover, Germany

[73] Assignee: SKF USA Inc., Elgin, Ill.

[21] Appl. No.: 08/896,994

[22] Filed: Jul. 18, 1997

[51] Int. Cl.[6] ................................................ F16J 15/32
[52] U.S. Cl. ..................... 277/309; 277/353; 277/551; 277/571; 277/572
[58] Field of Search .................................. 277/309, 371, 277/353, 402, 549, 551, 571, 572

[56] References Cited

U.S. PATENT DOCUMENTS

| | | |
|---|---|---|
| 4,669,895 | 6/1987 | Colanzi et al. . |
| 4,928,371 | 5/1990 | Colanzi et al. . |
| 4,991,982 | 2/1991 | Colanzi et al. . |
| 5,015,001 | 5/1991 | Jay . |
| 5,201,529 | 4/1993 | Heinzen . |

*Primary Examiner*—Anthony Knight
*Assistant Examiner*—Karlena D. Schwing
*Attorney, Agent, or Firm*—James T. FitzGibbon; Vedder, Price, Kaufman & Kammholz

[57] ABSTRACT

A two-piece cartridge-type seal for wheel bearings and the like. The seal element contains a radial flange having a seal attached thereto and a mounting flange portion. The wear sleeve portion includes a cylindrical flange receivable over a rotary part, and a radial flange having an extension with an inner surface which engages a part of the seal during installation only. In use, the radial flange of the wear sleeve is engaged by a tool, and this radial flange deflects slightly to push the seal element into a desired position of installation, whereupon, when the tool is removed, the radial flange springs back and creates a slight working clearance between these parts.

18 Claims, 2 Drawing Sheets

CASSETTE TYPE SEAL WITH RADIAL AND AXIAL LIP

BACKGROUND OF THE INVENTION

The present invention relates generally to exclusion seals and more particularly to various forms of so-called cassette seals often used in automotive and other applications. In particular, the invention relates to a simple and reliable way to position a seal outer case and wear sleeve relative to each other, insuring that there is proper axial space for the axial elastomeric lip in case one element is accessible to the mounting tool, and to provide a labyrinth with extremely small clearance and minimum variation in such clearance due to tolerance stack-up.

By cassette seals as used herein is meant a seal containing two separately manufactured elements installed and used as a unit in a given application; cassette seals include a composite seal element and a wear sleeve element. With this type of seal, the composite seal element includes a mounting flange and a seal body attachment flange with an elastomeric seal body bonded thereto and including surfaces adapted to engage a mating part along a generally circular locus to form a seal band. In most ordinary seals, the part mating with the seal comprises a shaft or other machine part. In the cassette seal, the cooperating sealing surface is instead formed on a second element, usually termed a wear sleeve. This element normally includes a cylindrical surface cooperating with a seal band-forming portion of the radially acting seal body, and one or more radial flanges that, among other things, serve an excluder, labyrinth or similar protective function.

Some of the advantages of a two-element seal are well known. For example, a seal assembly wherein both elements are made by the same manufacturer can be pre-sized and pre-fit so that there will be no question about proper functioning upon installation. From an administrative or quality assurance standpoint, both elements are made by the same entity and accordingly, elimination of possible defects and accountability for possible imperfections is rendered relatively simple and straightforward. With most two-element seals of the type with which the invention is concerned, therefore, sealing conditions can be carefully controlled so that the composite seal and the wear sleeve elements cooperate fully and operate as designed, free from malfunctions that might otherwise be caused by misapplication or misinstallation of the product or the like.

However, seals of type in question, although advantageous in respect to the problem of accurate, reliable and generally foolproof sealing, have a few possible drawbacks. One of these relates to the manner in which the seal is actually installed in practice, bearing in mind that this is done on a mass production basis. In this connection, it will be appreciated that although the cost of an oil seal is very small in relation to the value of the mechanism being protected, its potential for damage or dissatisfaction is large.

If a seal fails, there is not only the expense of seal replacement, but also the cost of labor. Considering that many seals are normally extremely inaccessible in use, replacement labor is a significant expense. If the seal failure has occasioned damage to the sealed part, then there will be a still further expense. Therefore, virtually completely foolproof installation of a seal is necessary to insure that it will perform according to expectations. Thus, one or more properly designed and installed low cost seals may insure extended service life for expensive elements such as wheel hub assemblies or even engines, transmissions or the like.

In this connection, installation of two-element seals has created a problem in many applications. In order to achieve proper installation, the two elements need to be spaced axially apart to a relatively exact degree. One way in which this may be achieved is to separately insert one element and subsequently insert the other one, measuring the distance between the two by a separate operation. In some instances, a specialty tool is provided with seal-engaging surfaces that are offset by a distance equal to the desired clearance which is intended to remain when installation is complete. However, this approach has some drawbacks, particularly where the flange that is to be engaged by one portion of the tool is obscured by another portion of the seal or by the portions of the housing in which the seal is to be positioned.

In some instances, the seals are constructed in a "unitized" assembly wherein the two elements are pre-assembled and subsequently inserted as a unit into the application. However, the process of installation normally involves transferring force from one part of one element to the other in a manner which leaves parts in contact that are subsequently required to be abraded. This can create a problem during the initial wearing or "bedding in" process undergone by the seal, and in some cases, thereafter.

Moreover, forming the seal in an assembly at the factory requires additional elements, such as snubbers, chaplets or the like to be present and in some cases, various auxiliary flanges or curls are required to be imparted to the elements to insure the proper relative positioning of the seals. Manufacturing seals of this sort therefore involves a greater cost than should be necessary to achieve desirable results.

According the to the present invention, it has been found that a pair of cooperating seal elements can be designed and manufactured in such a way that, upon installation, one part may be made to bear upon the other for the purpose of transmitting an installing force suitable to position both elements of the seal properly and, upon release of that installing force, a flange of one of the elements will, through its own innate resiliency, spring back to an unstressed or fully installed position wherein there is a slight but definite clearance between such part and its companion element.

This does away with the need for abradable snubbers or the like and also insures that the seal will be properly vented upon initial installation. As will be apparent, if there is metal-tc-metal contact between parts that rotate relative to each other, the seal would be initially damaged. Where abradable materials are provided for this purpose, scrap in the form of fine dust or like particles are created and, as pointed out above, the ability to have fresh air circulate in the region of the primary seal lip can be impeded during this process. However, the parts should lie close enough to each other to provide a labyrinth effect.

The prior art having offered products which are capable of improvement in regard to cost and reliability of installation, it is an object of the invention to provide an improved, dual-element excluder seal.

Another object of the invention is to provide a two-element seal, one of which comprises a composite seal element and the other a so-called wear sleeve or companion flange of special design and construction.

Yet another object of the invention is to provide a two-element seal wherein portions of the two elements cooperate with each other during installation to insure a completely reliable installation process.

Still another object of the invention is to provide an excluder seal assembly wherein a portion of a first element transiently engages a portion of a second seal element during installation to transfer axially applied forces thereto, and wherein such portion of the first element springs back upon completion of the installation so as to provide a working clearance between the two elements.

A further object of the invention is to provide a two-element seal assembly which, by reason of design and manufacture, eliminates the need for so-called for pre-unitized construction.

A still further object of the invention is to provide a seal of the cooperating parts or so-called cassette type which is able to be manufactured and installed reliably at low cost and which will deliver consistently outstanding performance in use.

An additional object of the invention is to provide a seal in which, in one form, a radial flange on the wear sleeve engages an axial flange on the composite seal element during installation, and wherein, in another form, the wear sleeve radial flange engages a radial flange extending from an axial or mounting flange surface of the composite seal element during installation.

Another object of the invention is to provide a seal assembly wherein the wear sleeve may undergo rotary motion and have a portion that will serve an auxiliary function such as providing apertures or "teeth" for cooperation with the sending or pickup elements of an anti-lock braking system, electronic speedometer or the like.

Yet another object of the invention is to provide a form of two-element seal wherein the individual elements may be varied somewhat in construction and arrangement and still achieve the desired advantages during installation, namely, the use of one portion of one element to bear against a portion of the other element during installation and to spring back to an unloaded or unstressed position during use, thus providing a labyrinth with a definite space between elements.

The foregoing and other objects and advantages of the invention are achieved in practice by providing an excluder seal having a composite seal element and a wear sleeve element adapted to cooperate with each other, with the seal element including a seal body having portions adapted to engage the wear sleeve element to form a dynamic seal band therewith and a wear sleeve element having a wearing surface in opposed contacting relation to the seal band forming surface on the composite seal element, and further including at least one resilient flange having one surface able to be engaged by an installation tool and another surface adapted to engage a part of the composite seal element on the surface of the flange opposite the surface engaged by the installing tool.

The manner in which the foregoing and other objects and advantages of the invention are achieved in practice will become more clearly apparent when reference is made to the following detailed description of the preferred embodiments of the invention set forth by way of example and shown in the accompanying drawings, in which like reference numbers indicate the corresponding parts throughout.

DESCRIPTION OF THE PREFERRED EMBODIMENTS OF THE INVENTION

While the seals made according to the invention may be embodied in various forms, a description of several presently preferred forms of excluder seal assemblies incorporating the invention will be given wherein the application is that of a wheel hub or the like, wherein grease is the sealed medium and wherein the seal casings are made from a stiff but resilient material such as steel or other metal and wherein the seal body is made from a synthetic elastomer.

Figure 1:
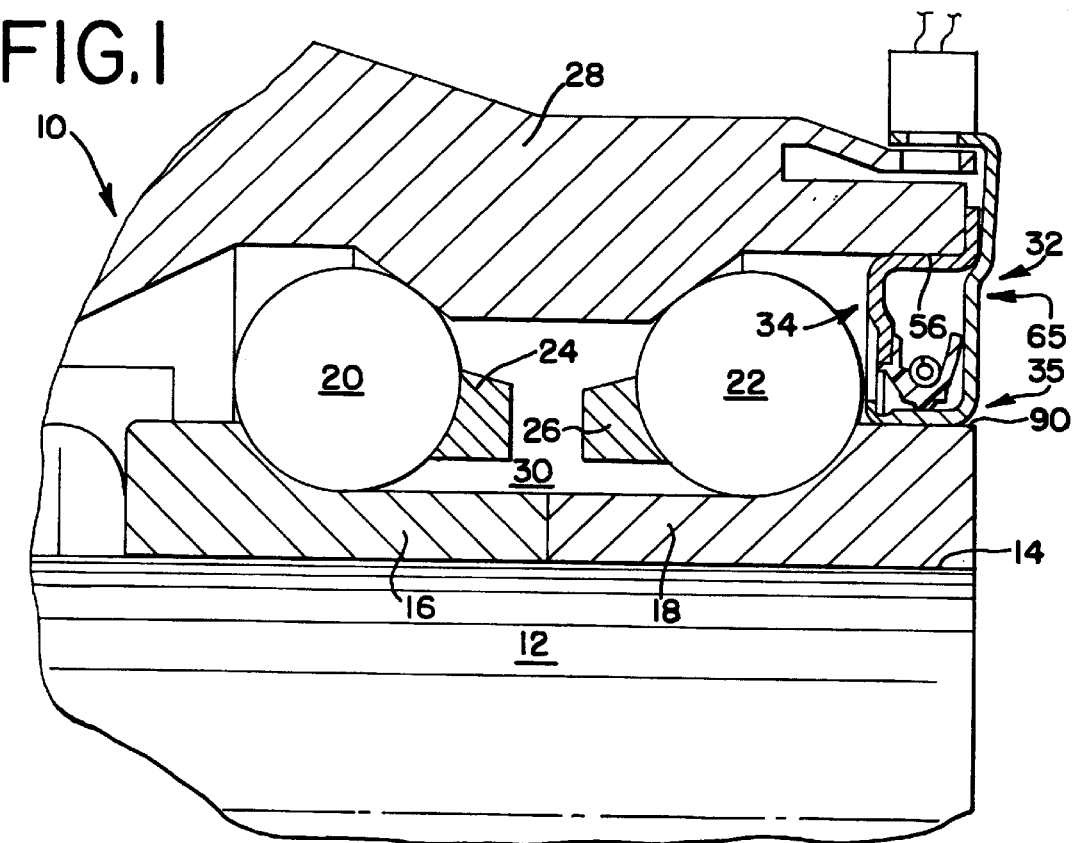
FIG. 1 is a fragmentary vertical sectional view of a portion of a wheel hub mechanism showing the excluder seal of the present invention in an installed position of use.

Referring now to the drawings in greater detail, FIG. 1 shows a wheel hub assembly generally designated 10 and shown to embody the novel excluder seal of the invention. In FIG. 1, a rotary shaft 12 includes a cylindrical exterior surface 14 over which are pressed a pair of substantially identical but mirror image inner bearing races 16, 18. The races 16, 18 position two rows of ball bearings 20, 22, located by cages 24, 26 in a known manner. The rows of bearings run in a contoured, radially outer race 28 which is shown for purposes of illustration as being integral with a fixed portion of the hub. As known to those skilled in the art, the outer race is more customarily made as a separate ring which is pressed into place within a cylindrical opening in the wheel hub 10.

The shaft 12 and the bearing assemblies just described combine to define a sealed interior region 30 in which a suitable grease such as a mineral-oil based or synthetic grease or the like is to be confined in use. The sealed region 30 is closed off by a two-piece seal assembly generally designated 32 and shown to incorporate the novel features of the invention. As shown, the seal 32 includes a pair of principal elements, namely, a seal element generally designated 34 and a wear sleeve element generally designated 35, such parts being best shown in one embodiment in FIGS. 2–3.

The seal element 34 includes a stiff casing portion generally designated 36 which includes a radially inner, (and in this example, a somewhat axially offset) bonding portion 38 to which an elastomeric seal body generally designated 40 is secured by bonding in a known manner. The seal body 40 is ordinarily designed so as to include axially outer and inner (or "air" and "grease") side frustoconical surfaces 42, 44 meeting along a generally circular locus to form a seal band 45 of intended contact with an outer circumferential surface of the axial flange of the wear sleeve element generally designated 35.

In a preferred form, the seal body is urged radially inwardly by a circumferential garter spring 46. The seal body 40 also preferably includes an auxiliary or excluder lip body 47 which is arranged to form a contact locus 48 along an axially inwardly directed end face surface 49 of the wear sleeve 35. As used herein, "axially inner" means toward the sealed region and "axially outer" means toward the outside or away from the sealed region. According to the invention, the casing 36 also includes an inner radial flange 50, an axial mounting flange 52 with an exterior cylindrical surface 54 which is engagable with a counterbore 56 (FIG. 1) formed in the outer bearing race 28 or other element. The casing 36 also includes a depth stop flange 58 having an axially outwardly directed end face surface 59 and an axially inwardly directed, race-engaging end face surface 61.

Referring now to the wear sleeve 35, this element includes a generally axially extending flange 60 having a curl 62, preferably of reduced thickness adjacent its axially inner end. The axial flange 60 has an outwardly directed circumferential contact surface 64 which is engaged by the seal band 45 on the elastomeric lip body 40 in cooperating, grease-tight relation. The radially inwardly directed surface 66 of the axial wear sleeve flange 60 is pressed into snug engagement with a shoulder surface 90 forming a part of the bearing inner race 18.

Figure 2:
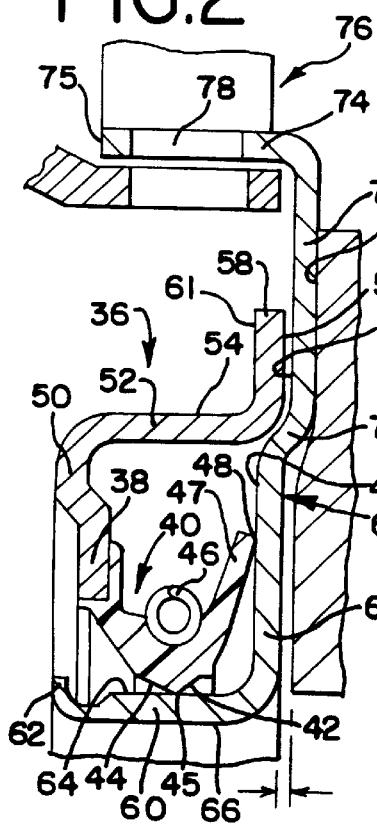
FIG. 2 is a greatly enlarged fragmentary vertical sectional view of the seal of FIG. 1 showing the seal prior to installation.

Referring again to the wear sleeve element 35, this unit includes a radial flange generally designated 65 and having an inner radial flange section 68, an offset portion 70 and a radially outer, more flexible flange section 72. As shown in FIGS. 1–3, the wear sleeve 35 may optionally include an auxiliary, radially outermost flange 74 which extends axially inwardly of the plane of the more flexible section 72 and terminates in a free end 75. In the form of seal shown in FIGS. 1–3, the auxiliary flange 74 is used as a part of a pulse generator/sensor assembly generally designated 76. The flange 74 is also shown to optionally carry a sensor, 78 e.g., an inductive pick-up, to generate electric pulses when being passed by teeth or crossbars attached to the hub 28. Alternatively, a Hall-sensor may be used in combination with an alternating magnetic field that rotates with the hub. In another embodiment, the flange 74 in itself may act as a pulse ring, while the sensor may be mounted directly in the flange 74.

For rotating inner rings, the arrangement would be reversed in that flinger 72 would act as the pulse wheel, while the stationary outer ring 28 of the unit would carry the sensor.

In summary, the seal element thus includes an axial mounting flange portion and a radial flange with a free end portion. In the seal element, the flange with the free end contains the seal body and in the wear sleeve, the flange with the free end serves as the installation force-transmitting element.

Figure 3A:
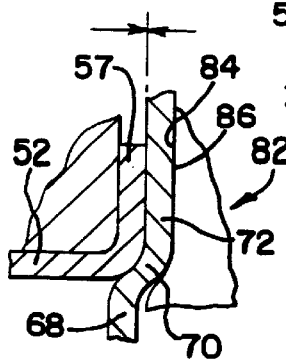
FIG. 3A is a fragmentary sectional view somewhat diagrammatically illustrating the relation of certain portions of the seal elements to each other during a transient phase of their being installed.
Figure 3:
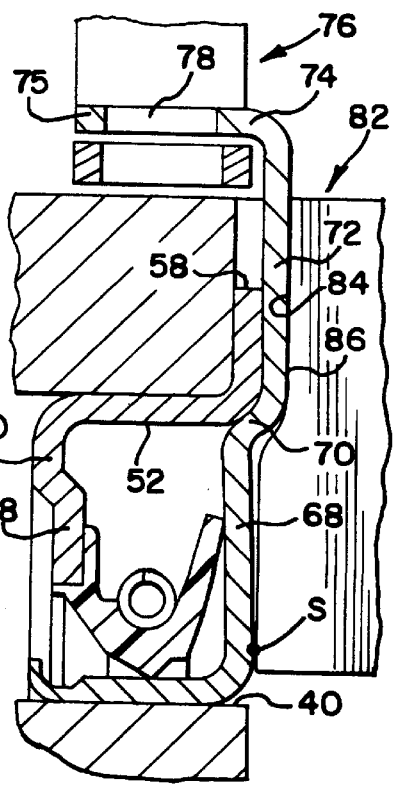
FIG. 3 is a fragmentary vertical sectional view of the seal of FIG. 2, shown with a part of the installing tool during the process of installation.

FIGS. 3 and 3A also show that an installation tool generally designated 82 desirably includes an end face portion 84 for contacting the outer face of one or more segments 68, 72 of the wear sleeve radial flange 65.

Referring now to the installation and operation of the seal of the invention, the installation of the seal is the ultimate in simplicity. Thus, a tool 82 of an annular configuration, and with either a flat or contoured contact surface 84 is positioned with such contact surface 84 engaging the outer face 86 of the flexible flange 72. According to the invention, and referring in particular to FIG. 2A, these contact surfaces are the exterior end face 59 of the depth stop flange 58 and the counterpart opposed or inwardly facing surface 63 on the flexible flange 72.

Figure 2A:
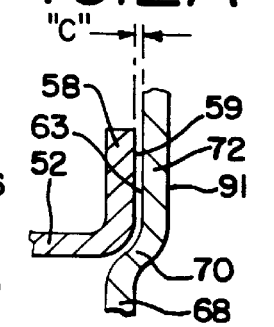
FIG. 2A is a fragmentary sectional view somewhat diagrammatically illustrating the relation of parts of the seal assembly to one another prior to installation.

There is a static clearance space "C" (FIG. 2A) between these surfaces in the installed position of use of the seal, as is shown in FIGS. 1, 2 and 2A. However, during installation, as shown in FIGS. 3 and 3A, the installation tool urges both seal elements to the left as shown in the drawings against the press fit resistance of the counterbore 56 and the o.d. surface 90 of the inner bearing race 18. Thus, when the seal is installed, the 5 force needed to press the elements into position is transmitted from the installation tool to the flexible flange 72 with the free end portion. The inner flange surface 63 contacts the outer opposed face 59, and thus urges the axial flange 52 into the counterbore 56. At the same time, the forces applied to the radial flange 65 are transmitted to the axial flange 60 of the wear sleeve, forcing its inner surface 66 over the outer surface 61 of the inner bearing race 18. When shaping the tool surface 84 e.g. with an adequate step, such that a gap "C" exists between the tool and the heel of flange 68 at the beginning, the flange will be deflected until the tool contacts in point "S" at the heel. When the depth stop flange 58 encounters the end face of the outer race 28 just outside the counterbore 56, a "solid height" is reached.

Thereupon, removing the installation tool 82 permits the free or unsupported end portions, i.e., the inner and outer segments 68, 72 of the radial flange to spring slightly backward, or axially outwardly, opening up the desired working clearance space "C" (FIG. 2A). This space thus permits venting and provides a labyrinth effect, but does not require snubbers or a sacrificial element that wears away with initial use of the seal. The offset 70 in the flange segments 68, 72 also provides a labyrinth effect.

Thus, the inherent flexibility of the radial flange 65, including its segments 68, 72 combine to provide a deformable but resilient free end that is used to establish a desirable predetermined clearance between the elements of the seal. The height of the step on the tool determines the clearance, provided the installation force generates the corresponding elastic deflection. The farther the contact point between tool 82 and the radially extending flinger 84 is spaced from the locus at which the wear sleeve is pressed over the shaft, the more deflection can be imposed on the flange with a given installing force.

Figure 4:
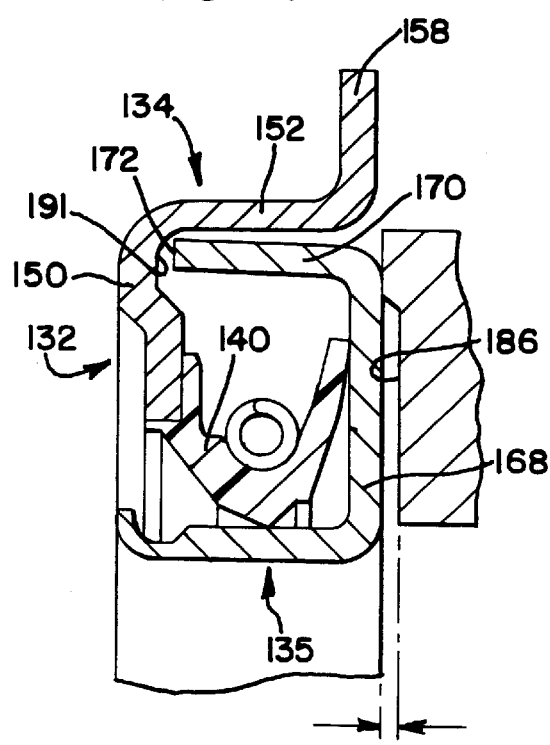
FIG. 4 is a vertical sectional view of a modified form of seal made according to the invention and showing the installing tool in phantom lines.
Figure 4A:
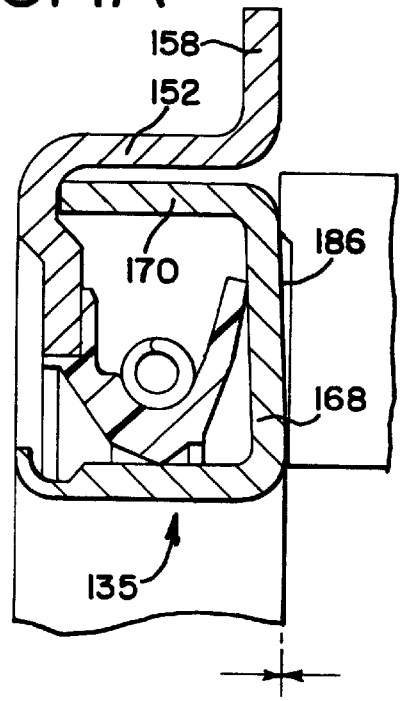
FIG. 4A is a fragmentary view of certain portions of the two seal elements and the tool of FIG. 4 shown during installation.

Instead of providing a narrow, defined labyrinth gap between the surfaces 59 and 63, another embodiment of the invention according to FIG. 4 incorporates a similar gap between the surface 191 of the seal outer case and the surface 172 of a collar 170 extending axially from the radial flinger 186. FIGS. 4 and 4A also show counterparts of the elements in FIGS. 1–3, namely, the seal 132, the seal casing 134, the wear sleeve flange 135, the seal body 140, the inner radial flange of the casing 150, axial flange 152 and depth stop flange 158. The radial flange 168 of the wear sleeve is also shown. Again, a stepped mounting tool acting on that flinger causes an elastic angular deflection during mounting (FIG. 4A); after removal of the tool, the springing back of the flinger provides the desired clearance as shown in FIG. 4.

Figure 5:
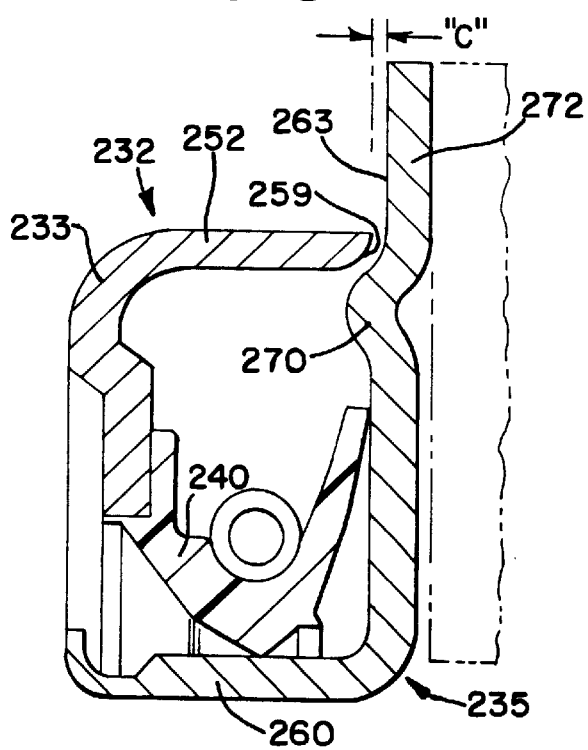
FIG. 5 is a vertical sectional view of a further modified form of seal assembly made according to the invention, shown with its installing tool in phantom lines.
Figure 5A:
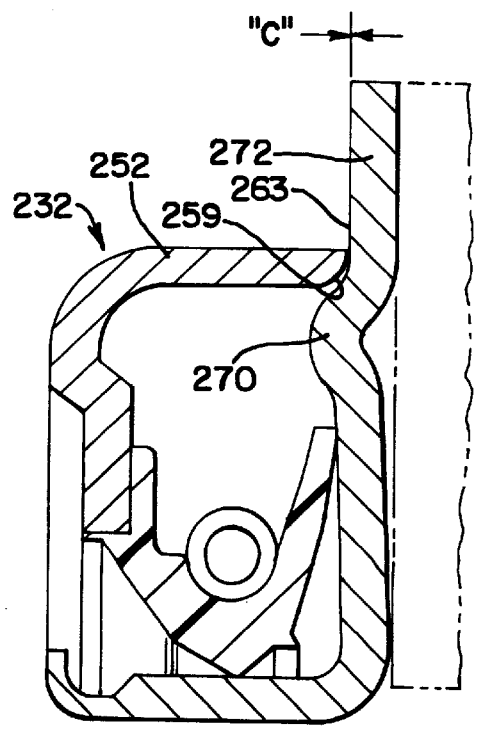
FIG. 5A is a partly diagrammatic sectional view showing deformation of a part of the wear sleeve element during installation of the seal of FIG. 5.

Referring now to FIGS. 5 and 5A, the application of this same principle is seen relative to seals generally designated 232 having a wear sleeve generally designated 235 and a seal element 240 having a casing 233. In this instance, the seal is similar to that of the embodiment of FIGS. 1–3 except that the axial flange 233 is the radially outermost portion of the seal casing 236. Consequently, there is no depth stop flange in this construction. The wear sleeve construction is generally similar to its counterpart in FIGS. 1–3 as regards its axial mounting flange 260 and the radially inner portion 268 of the radial flange. A rolled annular bead 270, or step, or combination thereof, can be provided to improve the stability of the radial flinger, and a free end is provided in the form of the flexible flange extension 272 extending radially beyond the bead 270. By choosing the step height equal to the desired gap in the labyrinth, a flat mounting tool may be used.

Here, the inner end face 263 of the flange extension 272 serves to contact the cut edge surface 259 on the end of the seal casing radial flange 252. As shown in FIG. 5, there is a clearance "C" between elements in their installed and relaxed condition, but this clearance "C" is eliminated during installation when the force applying tool (not shown) transiently causes a bottoming out between the surfaces 263 and 259. As shown in FIG. 5A, the tool achieves this contact and goes on to complete insertion of the seal in the counterbore. Thereafter, when the forces are released and the tool is removed, the casing extension 272 will spring back, reestablishing the gap "C" shown in FIG. 5. In this particular instance, the inner surface 263 of the flange extension 272 also may serve to contact a shoulder or outer end face surface 259 lying radially outwardly of the counterbore, such as the surface in FIG. 1.

From the foregoing, it will be understood that an important feature of the invention is the provision of a seal having a wear sleeve with an axial mounting flange, and a radial flange with a free end portion, thus leaving a flexible outer margin or flange extension with a contact surface which can be transiently engaged with a surface forming a part of or lying adjacent the mounting flange of the seal casing. During installation, the wear sleeve flex section moves between a stressed position wherein a portion of it contacts an opposed facing portion of the seal element casing and a relaxed, post-installation position wherein the opposed facing parts are separated by a working clearance. This construction provides the advantage of establishing a pre-determined working clearance between these parts without requiring the use of auxiliary elements, especially those that would, through initial wear, create dust or other debris.

The invention also comprehends the method of positioning a pair of seal elements comprising a single assembly in contacting relation, using an installing tool to force them into an installed position in relation to first and second machine parts, transmitting the installing force through a flex section of the wear sleeve element to the seal element and thereafter removing the installing tool and permitting the wear sleeve to move from a stressed position with its flex section in contact with the seal element to a relaxed condition where the elements are spaced apart by a working clearance.

It will thus be seen that the present invention provides a cassette type seal with radial and axial lip and flinger having a number of advantages and characteristics including those expressly pointed out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

I claim:

1. A two-piece excluder seal assembly comprising, in combination, a seal element and an associated wear sleeve element, said seal element including a relatively rigid casing unit having an axial mounting flange for fluid-tight positioning relative to a first machine part, a radially extending seal lip body locating flange, and an elastomeric seal lip body bonded to said seal lip body locating flange, said elastomeric seal lip body including air and oil side frusto-conical surfaces meeting along a generally circular locus to provide said lip body with a seal band area in contact with a portion of said associated wear sleeve element, said wear sleeve element including a radially inner, generally cylindrical flange having an inner surface for contacting a second machine part in fluid-tight relation and an outer surface in sealing contact with said seal lip body, a radially outer portion with an axially outer tool contact surface and an opposed, axially inner, force-applying surface in facing relation to a given portion of said seal element casing unit, and a stiff but resilient flex section joining said radially outer portion to said cylindrical flange, said seal element and said wear sleeve element being initially preassembled and constructed and arranged such that during installation, said flex section moves between a stressed position wherein said force-applying surface directly contacts said given portion of said casing unit to position said assembly relative to said first and second machine parts and a relaxed and installed position wherein said force-applying portion and said given portion are spaced apart by a working clearance.

2. A two-piece excluder seal assembly as defined in claim 1 which further includes a first machine part in the form of a seal-receiving counterbore.

3. A two-piece excluder seal assembly as defined in claim 1 wherein said radially outer portion of said wear sleeve element is an outer flange portion axially offset from said flex section, wherein said seal element casing unit includes a radially outwardly extending depth stop flange, and wherein said tool contact surface on said wear sleeve lies on said outer radial flange and wherein said inner, force-applying surface on said given portion of said seal element casing unit is an axially outwardly facing portion of said depth stop flange.

4. A two-piece excluder seal assembly as defined in claim 1 wherein said elastomeric seal lip body further includes an auxiliary lip having a portion in contact with an axially inner surface of said flex section.

5. A two-piece excluder seal assembly as defined in claim 3 wherein said wear sleeve element further includes an outermost axial flange lying radially outside said flex section and containing plural spaced apart teeth or apertures for cooperation with a signal pickup unit.

6. An excluder seal assembly as defined in claim 1 wherein said wear sleeve element includes a second flange extending axially inwardly from said radially outer portion of said wear sleeve and terminating in a free end, wherein said axially outer tool contact surface lies adjacent said radially outer portion and opposite said second axial flange, wherein said force-applying surface comprises said free end of said second axial wear sleeve flange and said given portion of said seal element casing includes a portion of said seal lip body locating flange.

7. An excluder seal as defined in claim 1 wherein said wear sleeve radial flange includes a circumferential bead lying adjacent the outer margin of said flex section, and a flange extension lying radially outwardly of said bead, wherein said tool contact surface and said force-applying surface lie adjacent but radially outwardly of said bead, said given portion of said casing unit comprising a free end portion of said seal casing axial mounting flange.

8. A two-piece excluder seal assembly comprising, in combination, a seal element and an associated wear sleeve element, said seal element including a relatively rigid casing unit having an axial mounting flange for fluid-tight positioning relative to a first machine part, a radially extending seal lip body locating flange and a depth stop radial flange with axially inner and outer faces, an elastomeric seal lip body bonded to said seal lip body locating flange, said elastomeric seal lip body including air and oil side frustoconical surfaces meeting along a generally circular locus to provide said lip body with a seal band area of contact with a portion of said associated wear sleeve element, said wear sleeve element including a radially inner, generally cylindrical mounting flange having an inner surface for contacting a second machine part in fluid-tight relation and an outer surface in sealing contact with said seal lip body, a radial flange joined to said wear sleeve mounting flange, said radial flange including an outer flange section with an inner face in opposed facing relation to said outer face on said depth stop, an outer end face and a radially extending flex section joining said wear sleeve mounting flange to said outer flange section, said seal element and said wear sleeve element being initially preassembled and constructed and arranged such that during installation, said flex section moves between a stressed position wherein said inner end face on said wear sleeve radial flange outer section directly contacts and applies a force to said outer face of said depth stop flange to seat said seal element with respect to said first machine part, and a relaxed and fully installed position wherein said outer face of said depth stop and said inner face of said wear sleeve are spaced apart by a working clearance.

9. A two-piece excluder seal assembly as defined in claim 8 wherein said outer flange section is axially offset from said flex section.

10. A two-piece excluder seal assembly as defined in claim 8 wherein said elastomeric seal lip body further includes an auxiliary lip having a portion in contact with an axially inner surface of said flex section.

11. A two-piece excluder seal assembly comprising, in combination, a seal element and an associated wear sleeve element, said seal element including a relatively rigid casing unit having an axial mounting flange for positioning relative to a first machine part and a radial bonding flange having an elastomeric seal lip body bonded thereto, said seal lip body contacting said associated wear sleeve element, said wear sleeve element including a cylindrical mounting flange having a machine part contacting surface and a seal lip body contacting surface, and a flexible radial flange having a portion spaced radially outwardly of said mounting flange and being flexible into contact with a portion of said seal casing unit whereby an installing force may be simultaneously applied to said wear sleeve element to seat said wear sleeve element and transmitted through said wear sleeve element to said seal casing unit by reason of contact between adjacent, facing parts in order to seat said casing unit, said flexible flange being biased so that when said installing force is released, said flexible flange will return to an unstressed position wherein said contact portions are spaced apart by a working clearance.

12. A two-piece excluder seal assembly as defined in claim 11 wherein said adjacent, facing parts include a radially extending depth stop flange on said seal casing unit and an axially inner surface of said wear sleeve flexible radial flange.

13. An excluder seal assembly as defined in claim 11 wherein said adjacent, facing parts include a free end portion of an in-turned axial flange adjacent the radially outer portion of said wear sleeve flexible flange and an axially outer surface portion of said radial bonding flange on said casing.

14. A two-piece excluder seal assembly as defined in claim 11 wherein said adjacent, facing parts include an axially outer free end portion of said casing mounting flange, and an inner surface portion of said flexible flange.

15. An excluder seal assembly as defined in claim 14 wherein said adjacent, facing parts include an axially outer free end portion of said casing mounting flange, and an inner surface portion of said flexible flange, said flexible flange including a circumferential locating bead thereon and said inner surface portion lying adjacent and just radially outwardly of said locating bead.

16. A method of installing a two-piece seal assembly to position said assembly within a seal-receiving space defined in part by first and second relatively movable machine parts including a rotary part and a fixed part, said method including providing a two-piece seal assembly with a casing unit having a cylindrical mounting flange and a seal lip body affixed to a radial flange of said casing unit and a wear sleeve element with a cylindrical mounting flange and a flexible radial flange, including an axially outer face, positioning said seal assembly with said mounting flanges in contact with said first and second machine parts respectively, contacting said axially outer face of said flexible radial flange with an installing tool, exerting an installing force on said axially outer face of said flexible flange so as to deflect a portion of said wear sleeve element into force-transmitting contact with at least one portion of said seal element, pressing said element and said portion of said seal assembly into a predetermined axial position in said seal-receiving space, and thereafter removing said tool and permitting said flexible radial flange to relax so as to space said contact portions of said wear sleeve element and said seal casing unit apart by a working clearance.

17. A method as defined in claim 16 wherein contacting said axially outer face of said flexible radial flange with said installing tool includes contacting portions of said wear sleeve in general axial alignment with both of said mounting flanges.

18. A method as defined in claim 16 wherein said step of providing said seal assembly includes pre-assembling said seal element and said wear sleeve element by positioning said seal lip body over a portion of said wear sleeve and with both of said mounting flanges being generally in radial alignment.

* * * * *